(12) United States Patent
Chen et al.

(10) Patent No.: US 10,029,686 B2
(45) Date of Patent: Jul. 24, 2018

(54) DRIVETRAIN SYSTEM IMPLEMENTING PREDICTIVE CONTROL

(71) Applicant: Caterpillar Inc., Peoria, IL (US)

(72) Inventors: Qiang Chen, Dunlap, IL (US); James W. Landes, East Peoria, IL (US); Evan Earl Jacobson, Edwards, IL (US); Wesley E. Jacobson, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 236 days.

(21) Appl. No.: 14/987,397

(22) Filed: Jan. 4, 2016

(65) Prior Publication Data

US 2017/0190333 A1 Jul. 6, 2017

(51) Int. Cl.
| | | |
|---|---|---|
| *B60W 10/06* | (2006.01) | |
| *B60W 40/13* | (2012.01) | |
| *B60W 30/18* | (2012.01) | |
| *B60W 10/02* | (2006.01) | |
| *B60W 10/11* | (2012.01) | |

(Continued)

(52) U.S. Cl.
CPC ...... *B60W 30/18027* (2013.01); *B60W 10/02* (2013.01); *B60W 10/06* (2013.01); *B60W 10/11* (2013.01); *B60W 40/13* (2013.01); *F16D 48/00* (2013.01); *F16H 61/0204* (2013.01); *B60W 2300/12* (2013.01); *B60W 2530/00* (2013.01); *B60W 2710/021* (2013.01); *B60W 2710/0644* (2013.01); *B60W 2710/1005* (2013.01)

(58) Field of Classification Search
CPC ...... B60W 30/18; B60W 10/02; B60W 10/06; B60W 40/13; B60W 2710/021; B60W 2710/1005; B60W 2300/12; B60W 2530/00; F16H 59/04
See application file for complete search history.

(56) References Cited

U.S. PATENT DOCUMENTS

| | | |
|---|---|---|
| 5,385,515 A | 1/1995 | Chan et al. |
| 5,393,278 A | 2/1995 | Kyushima et al. |

(Continued)

FOREIGN PATENT DOCUMENTS

| | | |
|---|---|---|
| EP | 379 357 | 1/1990 |
| EP | 1 431 102 | 6/2004 |

(Continued)

*Primary Examiner* — Ramya P Burgess
*Assistant Examiner* — Lillian T Nguyen
(74) *Attorney, Agent, or Firm* — Finnegan, Henderson, Farabow, Garrett & Dunner, LLP; Jeff A. Greene

(57) ABSTRACT

A drivetrain system is disclosed for use with a machine having a work tool. The drivetrain system may have a transmission with a plurality of clutches. The drivetrain system may also have an input device movable by an operator to generate a first signal indicative of a desired selection of a park setting or one of a plurality of travel settings, a sensor configured to generate a second signal indicative of loading of the work tool, and a controller in communication with the input device, the sensor, and the transmission. The controller may be configured to anticipate completion of a loading cycle based the second signal, and to selectively cause at least a first of the plurality of clutches to engage in a combination that produces one of the plurality of travel settings based on the anticipated completion of the loading cycle, notwithstanding the desired selection from the input device being the park setting.

20 Claims, 3 Drawing Sheets

(51) Int. Cl.
*F16D 48/00* (2006.01)
*F16H 61/02* (2006.01)

(56) References Cited

U.S. PATENT DOCUMENTS

| | | | |
|---|---|---|---|
| 5,480,364 A * | 1/1996 | Hilbert | B60W 10/06 |
| | | | 477/107 |
| 5,761,628 A | 6/1998 | Steeby et al. | |
| 8,491,434 B2 | 7/2013 | Meyer et al. | |
| 8,657,045 B2 | 2/2014 | Wang et al. | |
| 2011/0313631 A1 | 12/2011 | Roth | |
| 2012/0100959 A1 * | 4/2012 | Hyodo | E02F 9/20 |
| | | | 477/111 |
| 2016/0002883 A1 * | 1/2016 | Sakon | E02F 9/2253 |
| | | | 414/685 |
| 2016/0063864 A1 * | 3/2016 | Ohsugi | B60P 1/286 |
| | | | 701/301 |

FOREIGN PATENT DOCUMENTS

| | | |
|---|---|---|
| RU | 2009135863 | 4/2011 |
| WO | WO 2015/051812 | 4/2015 |

\* cited by examiner

DRIVETRAIN SYSTEM IMPLEMENTING PREDICTIVE CONTROL

TECHNICAL FIELD

The present disclosure relates generally to a drivetrain system, and more particularly, to a drivetrain system implementing predictive control.

BACKGROUND

Mobile construction machines, such as off-highway mining trucks and articulated haul trucks, each include an engine that provides power to associated wheels via a planetary-type transmission (a.k.a., a power-shift transmission). A planetary-type transmission is generally made up of at least three different elements, including a sun gear, a planet carrier having at least one set of planet gears, and a ring gear. The planet gears of the planet carrier mesh with the sun gear and the ring gear. One of the sun gear, planet carrier and ring gear is driven as an input to the transmission, while another of the sun gear, planet carrier, and ring gear rotates as an output of the transmission. The sun gear, planet carrier, planet gears, and ring gear can all rotate simultaneously to transmit power from the input to the output at a first ratio of speed-to-torque and in a forward direction or, alternatively, one of the sun gear, planet carrier, and ring gear can be selectively held stationary or locked to rotate with another gear and thereby transmit power from the input to the output at a second ratio of speed-to-torque and/or in a reverse direction. The change in rotational direction and/or speed-to-torque ratio of the transmission depends upon the number of teeth in the sun and ring gears, the gear(s) that is selected as the input, the gear(s) that is selected as the output, and which gear, if any, is held stationary or rotationally locked with another gear. A hydraulic clutch (also commonly referred to as a brake) is used to hold particular gears stationary and/or to lock the rotation of particular gears together. An exemplary transmission having a planetary gear arrangement and multiple clutches is disclosed in U.S. Pat. No. 8,491,434 of Meyer et al. that issued on Jul. 23, 2013.

Although the conventional power-shift transmission may function adequately in most situations, it can also be slow during clutch engaging. That is, once an operator of a machine selects a particular gear setting to start the machine moving from rest, it may take some time for the corresponding set of clutches to fill with pressurized oil and fully engage. This time, although relatively short, compounds with each excavation cycle during a work shift. The accumulated time spent waiting for the clutches to engage reduces a productivity and efficiency of the machine. In addition, once the clutches engage and the operator depresses an acceleration pedal to start movement of the machine, it may take some time for the associated engine to build up enough power to drive the transmission, especially when the machine is fully loaded. This additional time waiting for the buildup of engine power further reduces productivity and efficiency.

The disclosed drivetrain system is directed to overcoming one or more of the problems set forth above and/or other problems of the prior art.

SUMMARY

In one aspect, the present disclosure is directed to a drivetrain system for a machine having a work tool. The drivetrain system may include a transmission with a plurality of clutches engageable in different combinations to produce a park setting and a plurality of travel settings. The drivetrain system may also include an input device movable by an operator to generate a first signal indicative of a desired selection of the park setting or one of the plurality of travel settings, a sensor configured to generate a second signal indicative of loading of the work tool, and a controller in communication with the input device, the sensor, and the transmission. The controller may be configured to anticipate completion of a loading cycle based on the second signal, and to selectively cause at least a first of the plurality of clutches to engage in a combination that produces one of the plurality of travel settings based on the anticipated completion of the loading cycle, notwithstanding the desired selection from the input device being the park setting.

In another aspect, the present disclosure is directed to a machine. The machine may include a frame, traction devices supporting the frame, a work tool operatively mounted to the frame, and an engine mounted to the frame and configured to power the traction devices and the work tool. The machine may also include a transmission driven by the engine and having a plurality of clutches engageable in different combinations to produce a park setting and a plurality of travel settings. The machine may further include an input device movable by an operator to generate a first signal indicative of a desired selection of the park setting or one of the plurality of travel settings, a sensor associated with the work tool and configured to generate a second signal indicative of loading of the work tool, and a controller in communication with the input device, the sensor, and the transmission. The controller may be configured to anticipate completion of a loading cycle based the second signal, and to selectively cause at least a first of the plurality of clutches to engage in a combination that produces one of the plurality of travel settings while the desired selection remains the park setting based on the anticipated completion of the loading cycle. The controller may also be configured to selectively cause at least a second of the plurality of clutches to engage and tie up the transmission at the same time that the at least a first of the plurality of clutches is caused to engage and while the desired selection remains the park setting, and to selectively cause the engine to increase its speed at the same time that the at least a first of the plurality of clutches is caused to engage and while the desired selection remains the park setting. The controller is further configured to release the at least a second of the plurality of clutches when the first signal indicates desired selection of one of the plurality of travel settings.

In yet another aspect, the present disclosure is directed to a method for controlling a drivetrain of a machine having a work tool, an engine, and a transmission. The method may include receiving an input indicative of a desired transmission selection of a park setting or one of a plurality of travel settings, sensing loading of the work tool, and anticipating completion of a loading cycle based on the sensed loading. The method may also include selectively causing at least a first of a plurality of transmission clutches to engage in a combination that produces one of the plurality of travel settings while the desired transmission selection remains the park setting based on the anticipated completion of the loading cycle.

DETAILED DESCRIPTION

Figure 1:
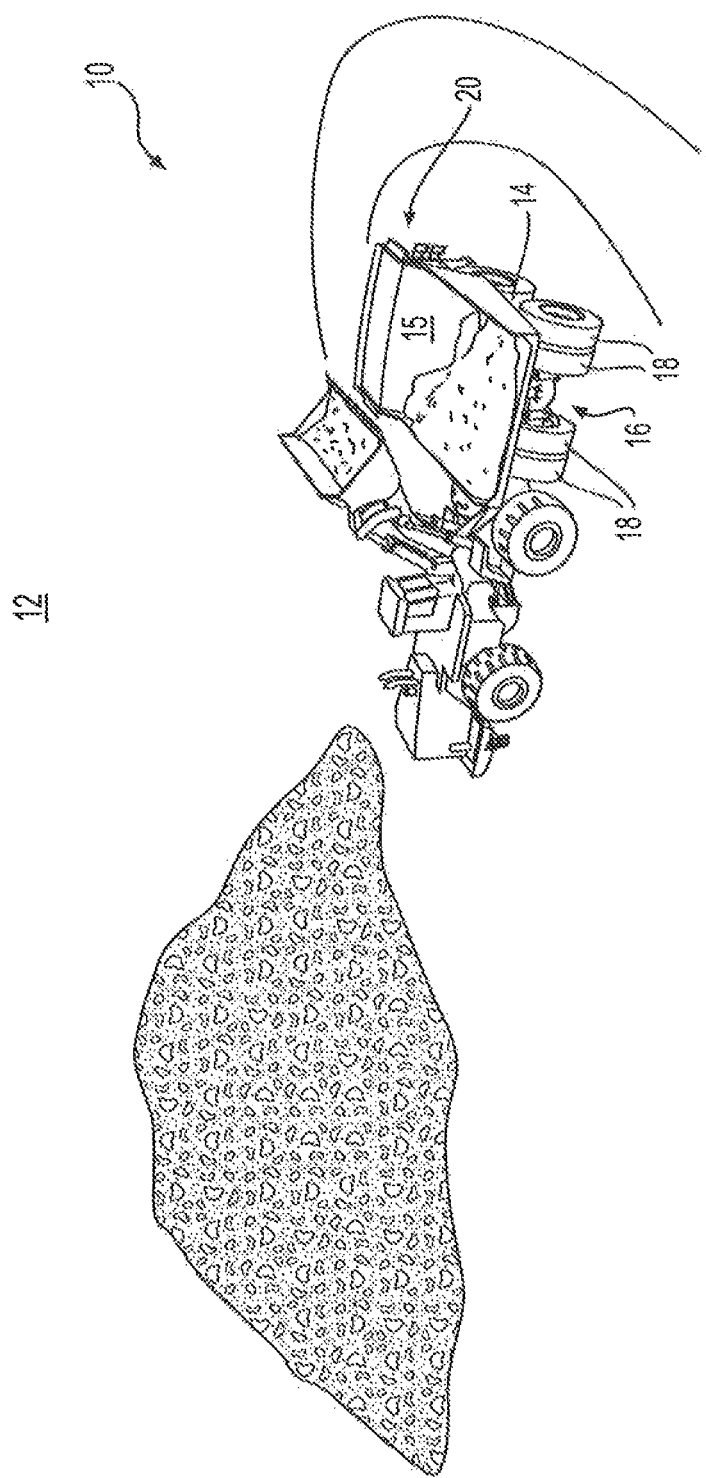
FIG. 1 is an isometric illustration of an exemplary disclosed machine.

FIG. 1 illustrates an exemplary mobile machine 10 that performs a predetermined task at a mine site, a landfill, a quarry, a construction site, or another type of worksite 12. In the depicted embodiment, machine 10 is a mining truck (e.g., an off-highway haul truck). It is contemplated, however, that machine 10 may embody another type of mobile machine, such as an articulated haul truck or a wheel loader. The predetermined task performed by machine 10 may require machine 10 to repetitively traverse worksite 12 while carrying a load between common destinations (e.g., between a load location and a dump location) during completion of a well-known excavation cycle (e.g., during a hauling cycle or a truck loading cycle).

Machine 10 may include, among other things, a frame 14, a work tool (e.g., a bed or a bucket) 15 pivotally connected to frame 14 and configured to receive the material load, a drivetrain system 16 mounted to frame 14, traction devices 18 operatively powered by drivetrain system 16, and an operator cabin 20 supported above frame 14. Drivetrain system 16 may be configured to power traction devices 18 (and in some embodiments also work tool 15), thereby propelling machine 10. Operator cabin 20 may house any number and type of input devices 22 (shown only in FIG. 2) for use by the operator in controlling drivetrain system 16. Exemplary input devices 22 include a gear selector 22a, an accelerator pedal 22b, and a park brake 22c.

Figure 2:
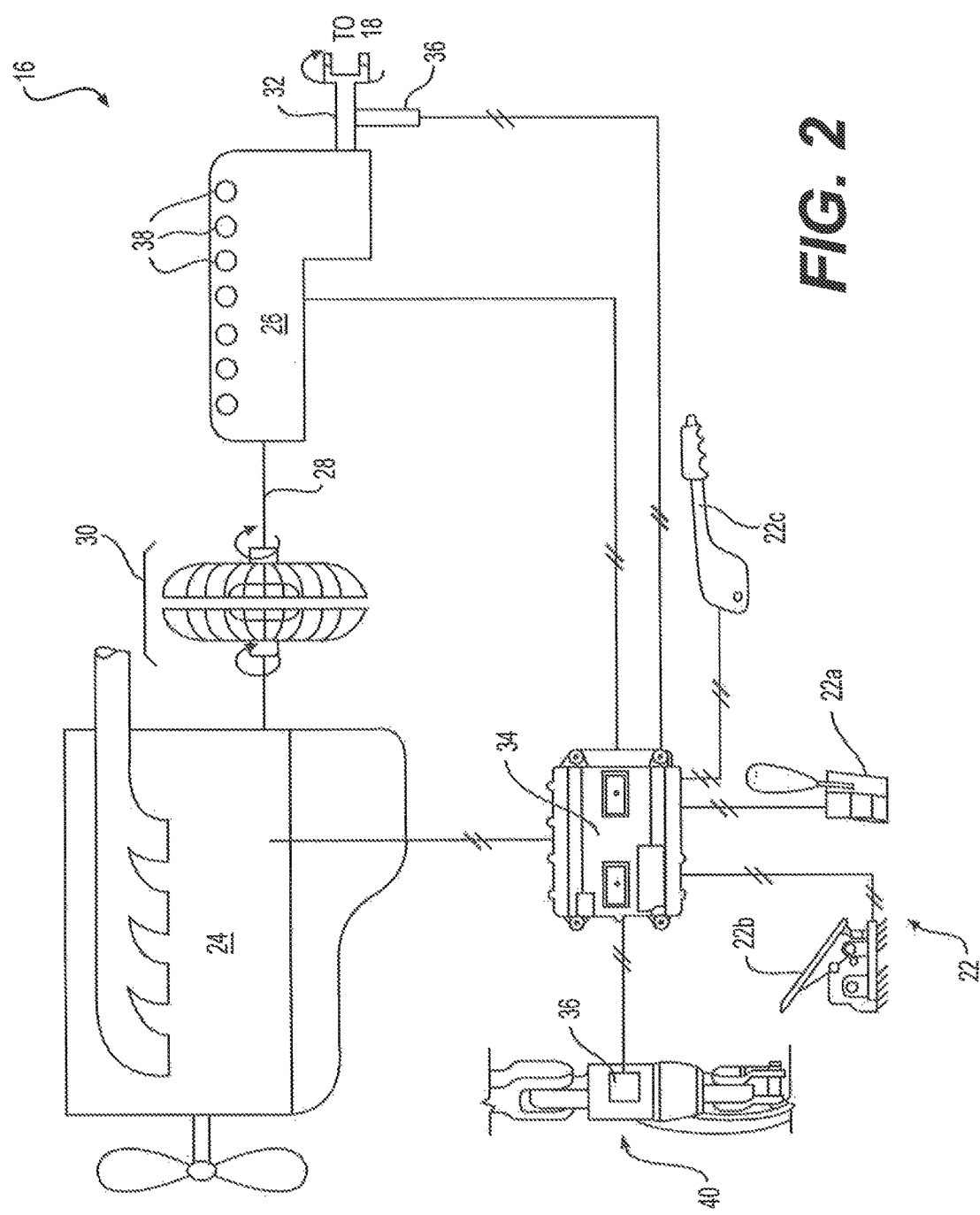
FIG. 2 is a diagrammatic illustration of an exemplary disclosed drivetrain system that may be used with the machine of FIG. 1.

As shown in FIG. 2, drivetrain system 16 may generally include an engine 24 and a transmission 26. Engine 24 may embody any type of engine known in the art, for example, a diesel engine, a gasoline engine, or a gaseous-fuel powered engine configured to generate a mechanical power output in response to an operator's use of accelerator pedal 22b. Transmission 26 may include an input 28 connected to the mechanical power output of engine 24 via a torque converter 30, and an output 32 connected to one or more of traction devices 18. Transmission 26 may embody a mechanical speed-shift transmission having at least one reverse gear setting, a park setting, and a plurality of forward gear settings. The reverse and forward gear settings, for the purposes of this disclosure, may together generically be referred to as propulsion or travel gear settings. Each of the different settings may be manually selected via gear selector 22a and/or selected automatically by a controller 34 in response to signals generated by one or more sensors 36, as will be explained in more detail below. When the reverse gear setting or one of the plurality of forward gear settings is selected and park brake 22c is released, drivetrain system 16 may function to propel machine 10. However, when the park setting is selected and/or park brake 22c is engaged, drivetrain system 16 may be inhibited from propelling machine 10.

Transmission 26 may include any number gear assemblies rotatably supported within a common housing on any number of aligned and/or parallel shafts. As is known in the art, the reverse gear setting, the park setting, and the forward gear settings of transmission 26 may be achieved by selectively joining different combinations of the gear assemblies. The structure of the different gear assemblies and the connections therebetween can be achieved using conventional components.

Transmission 26 may also include a plurality of clutches 38 selectively actuated to exert torque on portions of the gear assemblies inside the common housing to thereby rotationally lock the components to each other and/or to the housing in a variety of different combinations. These connections may facilitate a modification of the speed-to-torque ratio and/or the rotational direction received at input 28 relative to the speed-to-torque ratio and rotational direction delivered to output 32. In the disclosed embodiment, transmission 26 requires the simultaneous engagement of two of clutches 38 to produce the reverse gear setting or any one of the forward gear settings. The simultaneous engagement of three or more of clutches 38 may "tie up" transmission 26, thereby locking or otherwise inhibiting torque transmission from input 28 to output 32.

Clutches 38 may be selectively supplied with hydraulic fluid to cause engagement and the corresponding connection of the gear assembly components described above. For example, clutches 38 may each include one or more interior actuating chambers that, when filled with the pressurized fluid, displaces one or more pistons and moving the piston(s) toward one or more clutch packs. As a piston "touches up" to a clutch pack, the actuating chamber(s) of the clutch is full of fluid and the clutch is engaged to rotationally lock the corresponding components. Once commanded to engage, each clutch 38 may immediately begin to fill with pressurized fluid. However, a time delay may occur after engagement is commanded and before complete clutch engagement is achieved, while the associated actuating chamber is filling. Unless otherwise accounted for, this time delay can reduce a productivity and/or efficiency of machine 10.

Figure 3:
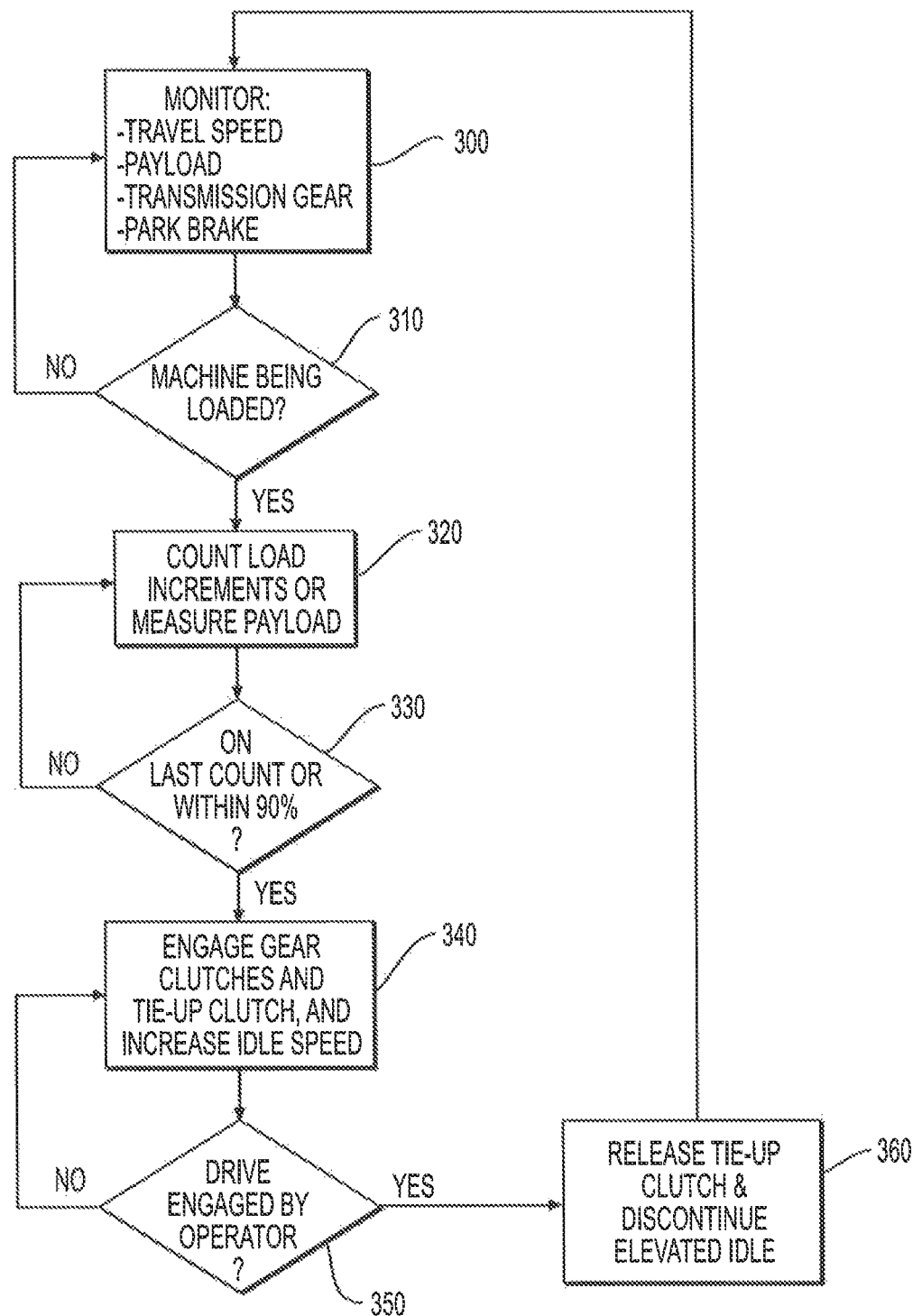
FIG. 3 is a flowchart depicting an exemplary method that may be performed by the drivetrain system of FIG. 2.

Controller 34, in response to signals generated by sensors 36, may be configured to selectively anticipate completion of a particular segment (e.g., the "loading segment") of the excavation cycle, and responsively initiate clutch filling before clutch filling is manually triggered by the operator. In this manner, the appropriate clutches 38 may be immediately ready to transmit torque when the operator desires machine 10 to start moving, thereby reducing or even eliminating the normally observed time delay. In addition, controller 34 may selectively raise idle speeds of engine 24 to further reduce travel start delays. This methodology is depicted in FIG. 3 and will be described in more detail in the following section to further clarify the disclosed concepts.

Controller 34 may embody a single or multiple microprocessors that include a means for monitoring a drive system operation and responsively initiating clutch engagement and engine speed elevation. For example, controller 34 may include a memory, a secondary storage device, a clock, and a processor, such as a central processing unit or any other means for accomplishing a task consistent with the present disclosure. Numerous commercially available microprocessors can be configured to perform the functions of controller 34. It should be appreciated that controller 34 could readily embody a general controller capable of controlling numerous other related functions. Various other known circuits may be associated with controller 34, including signal-conditioning circuitry, communication circuitry, and other appropriate circuitry. Controller 34 may be further communicatively coupled with an external computer system, instead of or in addition to including a computer system, as desired.

Any number and type of sensors 36 may be associated with drivetrain system 16 and used by controller 34 to recognize at which point in the excavation cycle machine 10 is currently operating. In one embodiment, sensor 36 is a load sensor associated with a strut 40 that connects frame 14 to traction devices 18. In another embodiment, sensor 36 is a travel speed sensor associated with output 32. In yet another embodiment, both load and travel speed sensors are employed. Other types of sensors may also be used.

As a load sensor, sensor 36 may take any form known in the art that is capable of generating a signal indicative of a loading status of work tool 15 (referring to FIG. 1). For the purposes of this disclosure, the loading status of work tool 15 may be associated with a volume of material inside of work tool 15, a weight of the material, and/or a force passing through work tool 15 during and/or after loads of material are deposited into work tool 15. For example, sensor 36 may be a load cell associated with a strut 40 that connects frame 14 to traction devices 18. Signals generated by sensor 36 may be directed to controller 34 for further processing.

As a travel speed sensor, sensor 36 be configured to generate a signal indicative of a speed of a rotating component of drivetrain system 16. In one embodiment, sensor 36 is imbedded within and/or forms a portion of output 32. In other embodiments, sensor 36 is associated with a final drive (not shown), a wheel hub (not shown), or another rotating component of drivetrain system 16. Signals generated by sensor 36 may be directed to controller 34 for further processing.

INDUSTRIAL APPLICABILITY

While the drivetrain system of the present disclosure has potential application in any machine requiring multiple speed and torque transmission levels, the disclosed drivetrain system may be particularly applicable to off-highway mining trucks, articulated haul trucks, wheel loaders, and other heavy construction machines that perform repetitive excavation cycles. The disclosed drivetrain system may improve the productivity and/or efficiency of these machines by providing anticipatory control over engine and transmission operations based on recognized segments of the excavation cycle. Operation of drivetrain system 16 will now be described with reference to FIG. 3.

In the disclosed example, the repetitive cycle is a hauling cycle, wherein machine 10 is filled with a desired amount of material at a first location, machine 10 driven to a second location, the material is dumped at the second location, and then machine 10 is driven back to the first location to repeat the cycle. Accordingly, the haul cycle consists primarily of a "loading segment", a "drive to dump segment", a "dump segment", and a "drive to fill segment". It is contemplated that other repetitive cycles (e.g., a truck loading cycle) could also or alternatively be completed by machine 10, if desired.

During operation of machine 10, controller 34 may monitor any one or more of the travel speed of machine 10, the payload of machine 10 (i.e., the loading of work tool 15), a current gear setting of transmission 26, and an activation status of park brake 22c (Step 300). These parameters may be monitored via one or more of sensors 36 and/or via direct communication with the corresponding components (e.g., with transmission 26 and park brake 22c). Controller 34 may then determine, based on these parameters, if machine 10 is currently being loaded (Step 310). Controller 34 may determine that machine 10 is currently being loaded when the travel speed is zero, when the payload is greater than a minimum amount and/or increasing, when the transmission gear setting is "park", and/or when park brake 22c is active. If machine 10 is not being loaded (step 310: N), control may return to step 300.

When controller 34 determines, however, that machine 10 is currently being loaded (step 310: Y), controller 34 may then count the number of loads of material being deposited into work tool 15 and/or monitor a weight or volume of the increasing payload (Step 320). Controller 34 may continuously compare the load count, weight, and/or volume to a threshold that corresponds with near-completion of the "loading segment" of the haul cycle (Step 330). In one embodiment, the threshold represents a total number of material loads that should be received by work tool 15. For example, if work tool 15 is normally capable of receiving five loads of material, the threshold used in step 330 may be four loads. In another embodiment, the threshold represents a minimum volume or weight of the material. For example, the threshold could be about 90% of a maximum (or historical) weight or volume capacity of work tool 15. As long as controller 34 determines at step 330 that the current loading of work tool 15 is less than the threshold (step 330: N), control may return to step 320. Otherwise, controller 34 may determine that the "loading segment" of the haul cycle is sufficiently near completion, and control may progress to step 340. It is contemplated that controller 34 may selectively learn the threshold based on historical operation of machine 10, if desired.

At step 340, which may occur prior to completion of the "loading segment" (and prior to the operator manually initiating the "drive to dump" segment), controller 34 may engage a combination of clutches 38 normally engaged by the operator at the start of the next cycle segment, simultaneously engage an extra "tie up" clutch 38, and simultaneously cause engine 24 to elevate its idle speed (Step 340). For example, if the "drive to dump" segment has historically been initiated by the operator using a first forward gear setting, controller 34 may cause the appropriate two clutches 38 corresponding to the first forward gear setting to fill with pressurized oil and engage during the final moments of the "loading segment". At this same time, controller 34 may cause any one other of clutches 38 to also fill with pressurized oil and engage, such that engagement of the first two clutches 38 does not cause significant torque transmission to (i.e., enough torque transmission to override park brake 22c and cause movement of) traction devices 18. Controller 34 may cause the idle speed of engine 24 to elevate to a level somewhere between a standard low-idle speed (e.g., about 700 rpm) and a speed normally requested by the operator at the start of the "drive to dump" segment (e.g., about 1400 rpm). For example, the idle speed may be raised by about 25-100%.

After completion of step 340, controller 34 may wait for the operator to engage a propulsion gear setting (e.g., one of the forward gear settings or the reverse gear setting) (Step 350), and then release the "tie up" clutch 38 and discontinue the elevated idle speed (Step 360). In some embodiments, controller 34 may additional wait for park brake 22c to be released before performing step 360. In the same or other embodiments, the elevated idle speed may be discontinued only when engine 24 is manually caused to exceed the elevated idle speed by the operator (e.g., by the operator pressing accelerator pedal 22b past a corresponding limit).

When the "tie up" clutch 38 is released, machine 10 may soon (e.g., immediately) thereafter start to move, as the torque-transmitting clutches 38 may already be filled with pressurized oil and engaged. That is, movement of machine 10 may no longer be dependent on the time it takes for clutches 38 to fill completely with pressurized oil. Instead, the only delay, if any, may be associated with a time it takes for the "tie up" clutch to release. Similarly, the acceleration of machine 10 may be increased at the start of the "drive to dump" segment due to the already elevated idle speed (and associated power output) of engine 24, allowing for a shorter time to complete the "drive to dump" segment.

It will be apparent to those skilled in the art that various modifications and variations can be made to the drivetrain system of the present disclosure without departing from the scope of the disclosure. Other embodiments will be apparent to those skilled in the art from consideration of the specification and practice of the drivetrain system disclosed herein. For example, although the disclosed drivetrain system is described as being used in conjunction with or including a combustion engine, it is contemplated that the drivetrain system could alternatively be used in conjunction with or include an electric power source (e.g., a battery, a tether, and/or a generator, if desired). For example, the electric power source could power an electric motor that drives transmission 26, if desired. It is intended that the specification and examples be considered as exemplary only, with a true scope of the disclosure being indicated by the following claims and their equivalents.

What is claimed is:

1. A drivetrain system for a machine having a work tool, comprising:
    a transmission having a plurality of clutches engageable in different combinations to produce a park setting and a plurality of travel settings;
    an input device movable by an operator to generate a first signal indicative of a desired selection of the park setting or one of the plurality of travel settings;
    a sensor configured to generate a second signal indicative of loading of the work tool; and
    a controller in communication with the input device, the sensor, and the transmission, the controller being configured to:
        anticipate completion of a loading cycle based the second signal; and
        selectively cause a first combination of the plurality of clutches to engage in a combination that produces one of the plurality of travel settings based on the anticipated completion of the loading cycle, notwithstanding the desired selection from the input device being the park setting.

2. The drivetrain system of claim 1, wherein the controller is further configured to:
    selectively cause a second combination of the plurality of clutches to engage and tie up the transmission at the same time that the first combination of the plurality of clutches is caused to engage and while the desired selection remains the park setting; and
    when the first signal indicates desired selection of one of the plurality of travel settings, release the second combination of the plurality of clutches.

3. The drivetrain system of claim 1, further including an engine configured to drive the transmission, wherein the controller is further configured to selectively cause a speed of the engine to increase at the same time that the first combination of the plurality of clutches is caused to engage and while the desired selection remains the park setting.

4. The drivetrain system of claim 3, wherein the controller is configured to cause the speed of the engine to increase to an elevated low-idle speed at the same time that the first combination of the plurality of clutches is caused to engage and while the desired selection remains the park setting.

5. The drivetrain system of claim 4, wherein the elevated low-idle speed is about 25-100% greater than a low-idle speed of the engine.

6. The drivetrain system of claim 4, wherein the controller is configured to disable the elevated low-idle speed when an operator requested engine speed exceeds the elevated low-idle speed.

7. The drivetrain system of claim 1, wherein the sensor is a load cell associated with a strut of the machine.

8. The drivetrain system of claim 7, wherein the controller is configured to:
    increment a loading pass count based on the second signal; and
    anticipate completion of a loading cycle when the loading pass count is one less than a desired loading count.

9. The drivetrain system of claim 8, wherein the desired loading count is received from the operator.

10. The drivetrain system of claim 8, wherein the desired loading count is learned by the controller from a previous excavation cycle.

11. The drivetrain system of claim 7, wherein the controller is configured to anticipate completion of the loading cycle when the second signal indicates a total payload within the work tool is within a threshold amount of a maximum payload.

12. The drivetrain system of claim 11, wherein the threshold amount is about 90%.

13. The drivetrain system of claim 1, wherein the first combination of the plurality of clutches includes at least two of the plurality of clutches.

14. A machine, comprising:
    a frame;
    traction devices supporting the frame;
    a work tool operatively mounted to the frame;
    an engine mounted to the frame and configured to power the traction devices and the work tool;
    a transmission driven by the engine and having a plurality of clutches engageable in different combinations to produce a park setting and a plurality of travel settings;
    an input device movable by an operator to generate a first signal indicative of a desired selection of the park setting or one of the plurality of travel settings;
    a sensor associated with the work tool and configured to generate a second signal indicative of loading of the work tool; and
    a controller in communication with the input device, the sensor, and the transmission, the controller being configured to:
        anticipate completion of a loading cycle based the second signal;
        selectively cause a first combination of the plurality of clutches to engage in a combination that produces one of the plurality of travel settings while the desired selection remains the park setting based on the anticipated completion of the loading cycle;
        selectively cause a second combination of the plurality of clutches to engage and tie up the transmission at the same time that the first combination of the plurality of clutches is caused to engage and while the desired selection remains the park setting;
        selectively cause a speed of the engine to increase at the same time that the first combination of the plurality of clutches is caused to engage and while the desired selection remains the park setting; and
        when the first signal indicates desired selection of one of the plurality of travel settings, release the second combination of the plurality of clutches.

15. A method of controlling a drivetrain for a machine having a work tool, an engine, and a transmission, the method comprising:
- receiving an input indicative of a desired transmission selection of a park setting or one of a plurality of travel settings;
- sensing loading of the work tool; and
- anticipating completion of a loading cycle based the sensed loading; and
- selectively causing a first combination of a plurality of transmission clutches to engage in a combination that produces one of the plurality of travel settings while the desired transmission selection remains the park setting based on the anticipated completion of the loading cycle.

16. The method of claim 15, further including:
- selectively causing a second combination of the plurality of transmission clutches to engage and tie up the transmission at the same time that the first combination of the plurality of transmission clutches is caused to engage and while the desired transmission selection remains the park setting; and
- when the input indicates desired selection of one of the plurality of travel settings, releasing the second combination of the plurality of transmission clutches.

17. The method of claim 15, further including selectively causing the speed of the engine to increase at the same time that the first combination of the plurality of transmission clutches is caused to engage and while the desired transmission selection remains the park setting.

18. The method of claim 17, wherein causing the engine to increase its speed includes causing the engine to increase its speed to an elevated low-idle speed at the same time that the first combination of the plurality of transmission clutches is caused to engage and while the desired transmission selection remains the park setting.

19. The method of claim 18, wherein the elevated low-idle speed is about 25-100% greater than a low-idle speed of the engine.

20. The method of claim 18, further including disabling the elevated low-idle speed when an operator requested engine speed exceeds the elevated low-idle speed.

* * * * *